May 30, 1939. J. J. JAKOSKY Re. 21,102
METHOD AND APPARATUS FOR CONTINUOUS EXPLORATION OF BORE HOLES
Original Filed March 9, 1937
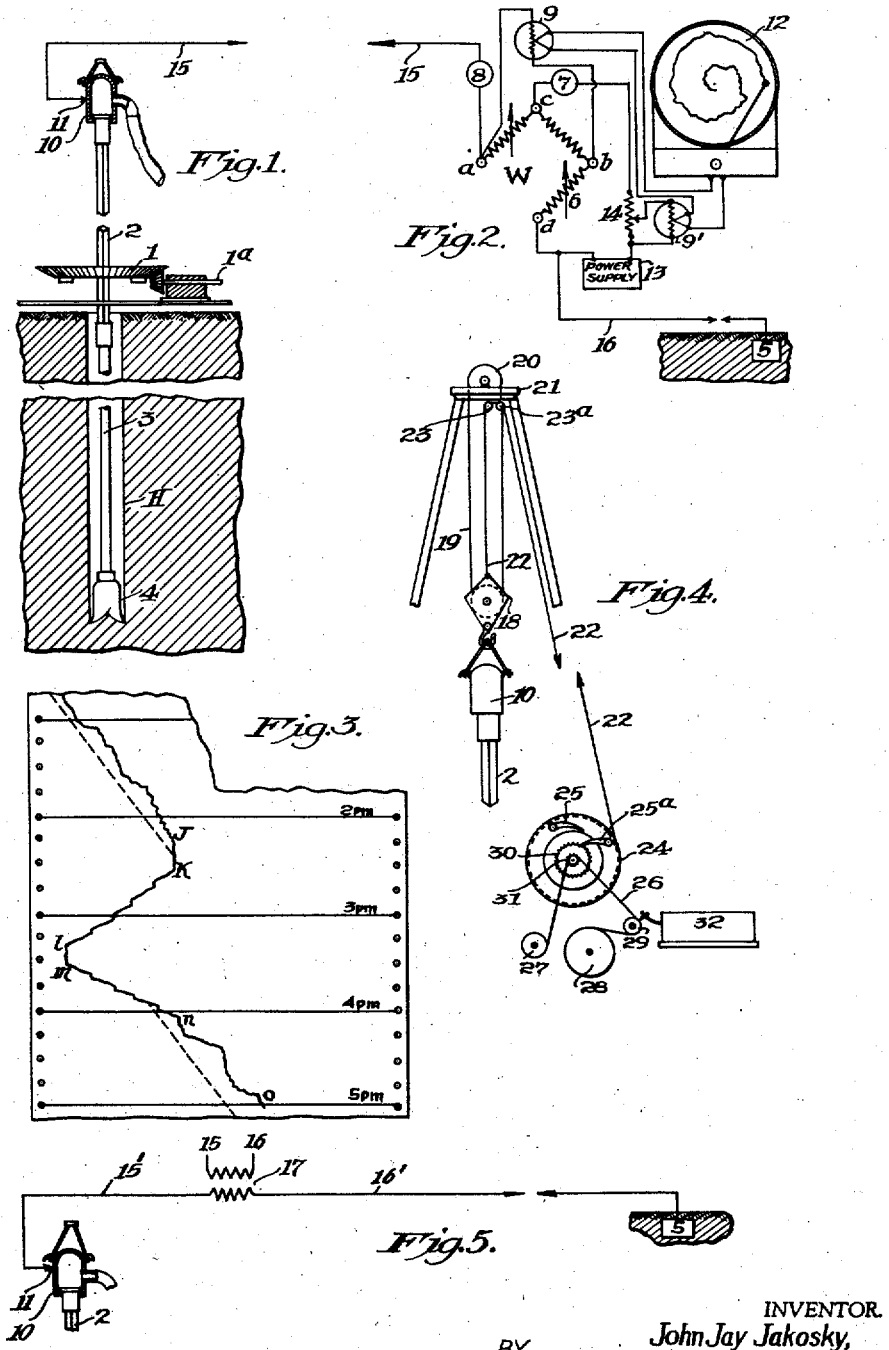
INVENTOR.
John Jay Jakosky,
BY Arthur P. Knight and Alfred W. Knight
ATTORNEYS.

Reissued May 30, 1939

Re. 21,102

UNITED STATES PATENT OFFICE 21,102

METHOD AND APPARATUS FOR CONTINUOUS EXPLORATION OF BORE HOLES

John Jay Jakosky, Los Angeles, Calif.

Original No. 2,150,169, dated March 14, 1939, Serial No. 129,839, March 9, 1937. Application for reissue April 5, 1939, Serial No. 266,232

20 Claims. (Cl. 175—182)

This invention relates to a new method and apparatus constituting an improvement in the art of determining the character and nature of the strata traversed by a bore hole, and more particularly it relates to the determination of the characteristics of the strata traversed by a bore hole while the drilling operations are in progress. This application is a continuation-in-part of my pending application Serial No. 94,063, filed August 3, 1936.

The principal object of the invention is to provide a method and apparatus which will give a visible, instantaneous, and preferably permanent record at the surface, as the drilling operations progress. Such records are of great value during drilling operations, especially in areas where the drilling must be stopped at a known horizon or strata, as for instance when drilling into a high pressure oil sand, or when drilling through an oil sand, and where water may be encountered by a stratum underlying the oil sand. By means of the present method and apparatus suitable indicating and signaling means may be located on the surface of the ground and the drilling operations supervised more intelligently.

A prior method has been suggested for this work, embodying an insulated drill pipe, or an insulated conductor extending down inside of a drill pipe, and a bit which is insulated from the drill pipe. The current flows from this insulated bit into the strata. The other terminal of the current circuit is at the surface of the ground near the mouth of the hole, or it may be the drill pipe itself. Suitable measuring instruments are included in this circuit for measuring variations in current and/or potential as the bit descends the hole. After repeated and extensive tests at commercial operations the method has proven to be of limited use due to the difficulty of properly insulating the drill pipe from the bore hole itself, or of passing an insulated wire down the inside of the drill pipe. Another practical difficulty in the latter method is to obtain proper insulation of the bit from the drill pipe. Insulating materials of this type are not usually of sufficient mechanical rigidity and ruggedness to withstand the severe conditions encountered in drill work. In the method which is described in this invention, these practical difficulties have been overcome, and in addition a simplified method of operation provided, which combines greater accuracy.

A particular object of this invention is to provide a method and apparatus in which a conventional form of drilling apparatus, which extends into a bore hole and is exposed to electrical contact with the wall of the bore hole substantially throughout its length, may be satisfactorily employed as an electrode in an electrical system for determining the nature and characteristics of the strata adjacent the lower end of said drilling apparatus, without the necessity of insulating one portion of the drilling apparatus from another or from the earth adjacent the mouth of the bore hole.

An essential feature of the present invention, which makes it possible to employ a non-insulated and exposed electrically conductive drilling apparatus in a bore hole as one electrode, consists in connecting the other electrode to the earth at a position sufficiently removed from the bore hole so that the electrical measurements taken between said electrodes are influenced to an important degree by variations in an electrical property, such as natural earth potential, resistance impedance, or dielectric properties, of the strata adjacent the lower end of the drilling apparatus. When the last-named or distant electrode is removed from the bore hole a distance greater than one-third the depth which the drilling apparatus extends within the bore hole, the condition for satisfactory measurements which reflect the electrical properties of the strata adjacent the lower end of the drilling apparatus is usually satisfied.

Thus, when passing an electric current through the earth between the drilling apparatus, which includes the surface equipment, the drill stem and the drill bit, in the case of a rotary drilling apparatus, and another electrode connected to the earth at a position sufficiently removed from the bore hole, the path of the current will in general be through the earth between all parts of the drilling apparatus and the last-named electrode. By removing this last-named electrode a sufficient distance from the bore hole the electrical characteristics of this current path through the earth, and consequently the measurements obtained as the drill is extended to different depths in the hole, are influenced to an important degree by the electrical properties of the strata adjacent the lower end of the drilling apparatus. This feature of my invention may be attributed to the flow of the current along and parallel to the bedding planes of the strata adjacent the lower end of the drilling apparatus, as described in my pending application Serial No. 55,600, filed December 21, 1935.

An important feature of this invention, therefore, is the employment of the distant electrode.

It will readily be seen that if an electrode adjacent the hole were employed, or a direct connection made to the surface casing as in present conventional methods of electrically exploring bore holes or portions thereof after they have been drilled, that the current would largely flow between the near-surface and surface drilling apparatus, and the adjacent surface electrode. Under such conditions, a sufficient portion of the current would not flow from the drill bit itself to give a readable or detectable change on the total current flowing in the circuit, as different strata are penetrated by the bit.

While the foregoing practical advantages of this improvement are of major importance, the method and apparatus contain certain important features of construction and arrangement which will become manifest as the process is studied, by reference to the following specifications and drawing, wherein:

Fig. 1 illustrates the essential parts of the conventional equipment employed in the rotary drilling of bore holes;

Fig. 2 is a diagrammatic illustration of one form of electrical circuit which may advantageously be employed in conjunction with various types of drilling apparatus;

Fig. 3 shows a portion of the recorded data or graph obtained in the usual rotary drilling operations, when my invention is applied;

Fig. 4 illustrates an arrangement which may be employed for directly recording the relationship between depth and electrical characteristics; and Fig. 5 is a diagrammatic representation of an alternative circuit arrangement which may be used in conjunction with the circuit shown in Fig. 2.

Fig. 1 illustrates the application of this invention to the conventional rotary system of drilling. In this figure, the rotary table 1 is connected to a proper source of motive power 1a. The rotary table, by means of the Kelly joint 2 transmits a rotary motion to the drill stem 3 extending within the bore hole H. At the end of the drill stem is the drilling bit 4. The Kelly joint is supported at its upper end by the swivel head 10. These parts constitute the usual type of rotary drilling equipment and need not be described in detail herein. A connection terminal 11 is in electrical contact with the swivel-head and associated drilling mechanism including the drill stem 3 and bit 4 and is associated with a suitable electrical energizing and measuring circuit, such as hereinafter described, for establishing an electrical circuit through the earth between the drilling apparatus and another electrode connected to the earth at a position remote from the bore hole.

The present invention is also applicable to various types of rotary drilling equipment and drilling bits, including various devices for obtaining rock samples, and to core-bits. In addition, the invention may be applied to cable drilling apparatus wherein a heavy bit assembly impacts and cuts into the earth by being alternately raised and lowered on a steel cable. The invention may also be applied to hydraulic drilling methods employing a pipe, extending into the bore hole, from which water under high pressure is being discharged. In short, the method and apparatus of this invention may advantageously be employed with any exploring and/or drilling apparatus which is constructed of, or employs, electrically conductive material or fluids.

One type of electrical circuit which may be employed for measuring the changes in resistance or impedance, as the drill penetrates the earth, is illustrated in Fig. 2. It will be understood, however, that any of the conventional circuits may be employed for measuring changes in current, potential, resistivity, impedance, or other electrical properties inherent to a current energized circuit, or measurements of natural earth potentials.

If direct current is employed, the readings obtained will be a function of the resistance of the formations adjacent the drill hole, while if alternating current is employed, the readings will be a function of the impedance of such formations. Broadly, it may be said that the measurements serve to indicate variations in the conductivity of the formations, the term "conductivity" being considered herein as including either straight conductance (the reciprocal of resistance) in the case of direct current, or admittance (the reciprocal of impedance) in the case of alternating current.

Electrical connection to the rotary drill stem may be made by means of terminal 11, as above described and the other contact to the earth is made by means of a suitable surface electrode 5, preferably of large contact area, placed a considerable distance from the hole. This distance is preferably one-third (or more) of the depth which the drilling apparatus extends within the bore hole. The distant electrode 5 should be firmly embedded in the earth in such a manner as to minimize the contact resistance. It is essential that this resistance be of a fixed nature, inasmuch as any variation in it will cause variations in the recorded data. I have found that the electrode should preferably be placed a distance of two to five feet below the surface of the ground, in order to prevent changes in conductivity due to changes in temperature between night and day, and changes caused by drying out of the soil or its wetting after a rain. The casing of a distant well may be utilized as a distant electrode, or a suitable electrode may be lowered into contact with the conductive fluid in a distant well for this purpose.

One arm, such as *b—d*, of the conventional Wheatstone bridge indicated generally at W is a variable resistor 6 which may be adjusted to equal the resistance of the well-distant electrode circuit at the start of the drilling and measuring operations. The points *a* and *d* of said bridge are shown as connected by conductors 15 and 16, respectively, to the drilling apparatus and the distance electrode 5. The power supply means 13 for the Wheatstone bridge may be any source of constant potential supply, either direct current or low frequency or high frequency alternating current. In a majority of cases it is convenient to employ 50 or 60 cycle alternating current available at the rig. In the latter case, it is preferable to employ a small, well insulated transformer, in order to isolate the measuring circuit from the power supply which is oftentimes grounded. The power supply is impressed across the bridge circuit at points *c—d*. An ammeter 7 is connected in series with the power supply means for showing the total current flowing in the bridge circuit, and a second ammeter 8 connected in conductor 15 shows the current flowing in the well-distant electrode circuit. Connected across the arms of the bridge, between points *a—b*, is a vacuum thermocouple 9, which measures the changes in potential produced across the bridge, as the conductivity of the earth's circuit is changed. The output of the vacuum thermocouple is connected to a suitable continuously recording meter 12, which usually records variations in the bridge potential versus time. In case the potential supplied by source 13 is subject to material fluctuation, I prefer to employ a compensating thermocouple 9′ whose input is connected in shunt with a variable resistance 14 in the line leading to the bridge and whose output is connected in series with the output of thermocouple 9, but in reverse relation thereto.

It will be seen that any type of measuring arrangement may be employed, but the vacuum thermocouple as described constitutes a particularly stable system for measuring these changes during the drilling operation. The vacuum thermocouple has a sufficient time lag so as to minimize the effect of transitory variations or fluctuations in the electrical circuit, such as minor and unimportant variations caused by changes in electrical conductivity as the drill stem and drill momentarily come in contact with different portions of the drill-hole wall and casing, as the drill and drill stem rotate. Due to the low power output of the vacuum thermocouple, it is preferable to employ it in conjunction with some type of sensitive photographic recording system.

It will be seen that when an electric current is passed through the earth between the drilling apparatus and the distant electrode 5, as by means of an associated power supply circuit such as above described, the current will flow between the earth and the drilling apparatus throughout substantially the entire length thereof, particularly when the bore hole contains a conductive fluid medium such as the aqueous drilling fluid ordinarily employed in rotary drilling operations. However, if the distant electrode is sufficiently removed from the bore hole a measurable portion of the current will flow throughout substantially the entire length of the drill stem or other drilling apparatus extending within the bore hole, and through the strata adjacent the lower end of the drilling apparatus. It is this current flow, which is measurable if the distant electrode is removed a sufficient distance from the bore hole, which gives electrical variations indicative of the nature of the strata adjacent the lower end of the drilling apparatus, as the drilling apparatus is moved to different depths.

Application of this invention to conventional drilling operations may be summarized briefly as follows:

Measurements may be made at any time after drilling operations have started. The measurements should begin, however, at a time when the strata exhibit characteristic electrical changes which may be employed for correlation purposes. In some areas, important electrical markers (strata which may readily be recognized by characteristic changes in electrical properties) manifest themselves many hundreds of feet above the oil sands, while in other areas important markers are encountered adjacent to the oil sands. In metal mining operations, the measurements should begin prior to the time the drill penetrates the mineral-bearing formations. For location of water-bearing horizons the measurements also should begin prior to the time the bit penetrates the water-bearing formation.

The electrical apparatus, diagrammatically illustrated in Fig. 2, is connected to the drilling mechanism and the distant electrode by means of suitable insulated wires. The bridge resistor 6 is adjusted to give a suitable position of the recording pen or light beam (preferably to the inner margin of the paper, when an increase in conductivity results in movement of the recording line to the right) on the sheet 12. If variations in power supply are noticeable, the resistor 14 should be adjusted to minimize these variations.

It will be recognized that when the drill is penetrating a medium of homogeneous conductivity, the recording line will gradually shift or drift to the right, inasmuch as more contact area is being exposed to the medium, resulting in an increase in conductivity and resultant current flow. When the drill penetrates a stratum of different electrical conductivity there will be a change in the slope of the recording line. If, for instance, the drill passes out of a good conducting medium into a highly resistant medium, there will be a change in the slope of the line, since there will be less drift for a given time interval. Interpretation of the data will necessitate, however, that consideration be given the different rates of penetration of the drill in strata of different degrees of hardness. For instance, the drill will penetrate 100 feet of a soft shale formation in less time that it will penetrate 10 feet of a harder formation. As a result the slope of the line is dependent as much upon the rate of drill penetration as upon the electrical properties of the strata. Before interpretation may be made of the record, under the extreme conditions just mentioned, the depth of penetration of the drill at given time intervals must be obtained from the driller's records. Final interpretation is therefore based upon changes in slope versus depth of penetration.

Another type of measuring and indicating apparatus which has proven satisfactory utilizes a triode vacuum tube, having its input (grid-filament) circuit connected across the arms *a*—*b* of the bridge, in place of the vacuum thermocouple 9. The plate circuit of the vacuum tube is connected to a recording chart, for recording variations in current versus time. The vacuum tube arrangement has the advantage of giving more power, which may be employed for actuating a heavier type of recording mechanism. If the triode tube is used, a pen-actuated stylus may be employed, giving a direct, visible reading of the variations in current on a paper chart.

Various types of continuous recording meters or systems may be employed, but one which has proven practical in operation is of a type which records the changes in current or potential versus time. The meter mechanism is actuated by means of a power amplifier vacuum tube, connected as described in the above paragraph. A record of this type gives considerable information to the drilling superintendent, besides merely the electrical properties of the strata passed through. For instance, all information relative to actual time of drilling, time consumed in going in and out of the hole, and time idle, is shown clearly on the chart. As the drilling proceeds, the resistance or impedance of the earth circuit naturally decreases, due to the larger contact area and the increased cross-sectional area of the path of current flow through the earth as the hole deepens. This results in a small but continual drift of the chart as shown in Fig. 3. Sharp breaks in the curve, or deviations from the general direction thereof, will indicate variation in the electrical characteristics of the strata penetrated by the drill bit, and differences in the slope of different portions of the curve will indicate differences in conductance or other electrical characteristics of the strata at two corresponding depths.

When the drilling operation stops, as marked at point *j*, the record is a practically straight line, from *j* to *k*. When the tools start out of the hole as at point *k*, there is a decrease in conductivity due to the decrease in effective electrode area, and the current decreases as shown between *k* and *l*. During the period that the tools are out of the hole, as between *l* and *m*, a straight line occurs. As the drill is being lowered to the bottom of the hole, the curve shifts to the right rapidly, as between *m* and *n*, and as further drilling progresses, it resumes its gradual shift to the right, as from *n* to *o*.

It will readily be seen that instead of using the continuous roll-type paper recording system, it is possible to employ the conventional circular recording chart. If desired, the chart may be allowed to make more than one revolution because the drift will cause the average recording line to spiral inward or outward, depending upon whether the chart mechanism is moving inward or outward for a decrease in resistance, impedance or the other electrical properties being measured. Due to this spiraling effect the condition obtained when a homogeneous medium is being penetrated by the drill will be a spiral, and any anomalous condition, such as a change in strata adjacent the lower end of the drilling apparatus, etc., will be indicated on the chart by a break or change in direction of the spiral.

Since the chart records time versus electrical properties, it is necessary to obtain from the driller's log the depth which the drill has reached for any certain period of time. In this manner the changes in electrical properties of the strata at different depths can be ascertained.

This invention also contemplates a recording method showing the relationship between electrical properties and actual depth. This may comprise a depth-recording system utilizing a measuring wheel frictionally held against the drill pipe as it descends the hole. This measuring wheel may actuate a gear system which in turn drives the recording paper.

Another method for showing the relationship between electrical properties and actual depth is diagrammatically illustrated in Fig. 4. In this figure the drilling assembly comprising a Kelly joint 2, supported by the swivel head 10, and the drill pipe and bit in the hole, is supported by a sheave wheel 18. Steel cables 19 are threaded through the sheave wheel over the crown block 20 at the top of the derrick 21. A small steel flexible cable 22 is connected to the sheave wheel 18. This cable passes over idler pulleys 23 and 23a, to the recording mechanism which is located at a convenient place on the derrick floor. The recording mechanism is actuated by movement of the cable 22 as the sheave block 18 moves upward and downward during the drilling operations. The actuating mechanism comprises a drum 24 on which the flexible cable 22 is wound. A sufficient number of turns are placed on the drum in order to allow the sheave block 18 its full extent of travel during drilling operations. Two ratchet pawls 25 and 25a are employed for obtaining the proper direction of rotation for the recording paper 26. When the drilling operations are in progress, that is, when the bit is on the descent, the pawl 25a engages the ratchet wheel 30. This ratchet wheel drives a sprocket wheel 31 which meshes with perforations along the edge of the recording paper 26. As the bit descends the hole the paper 26 is moved forward and a record made by means of the pen recorder, shown diagrammatically at 32. An idler wheel 29 is employed for rigidly supporting the paper as it passes the recording pen. The unused paper is on spool 28 and the used paper is on spool 27. Both of these spools are driven by means of proper spring belts connected to the driving assembly 30 and 31. The idler 29 is preferably placed from 12 to 18 inches from the drive sprocket 31 in order that visual observations may be made of the record as the drilling progresses.

When the pawl 25a engages the ratchet wheel 30, it will be seen that the paper is moved forward as the bit descends the hole. After the desired increment of drilling operation has been completed and it is desired to come out of the hole, the pawl 25a is manually disengaged from the ratchet wheel 30. The Kelly joint is now disengaged from the drill stem, and another section of drill stem inserted in the assembly. The bit is now lowered to the bottom of the hole and the pawl 25a again engaged. As the drilling operations are resumed, the record is continued. When it is desired to come out of the hole, the pawl 25a is disengaged. In some instances it is desirable to reverse movement of the paper, and this may be accomplished by engaging pawl 25. By means of an interlocking control between the pen recorder 32 and the pawl contacts, no record is usually made on the paper when its direction of movement is reversed.

An alternative circuit arrangement is shown in Fig. 5 in which the power supply and measuring circuit or circuits may be isolated from or indirectly associated with, the electrode circuit. Referring to said figure, I have shown the conductors 15 and 16 which emanate from the bridge W of Fig. 2, connected to one winding of a suitable transformer 17. The other winding of said transformer is shown connected through conductors 15' and 16' to the terminal 11 on the swivel head 10 and the distant electrode 5, respectively. Such a circuit arrangement may be advantageously employed as an alternative to the arrangement shown in Fig. 2 when alternating current measurements are being made.

It will be appreciated that numerous forms of measuring circuits and procedures may be employed in carrying out the method of this invention. For example, earth potential measurements may be taken with a suitable indicating or recording instrument associated with the two electrodes for measuring changes in potential, while measurements which depend upon the passage of current through the strata may be taken with a large variety of circuits. For example, the source of current may be directly associated with the electrodes as shown in Figs. 1 and 2, when either direct or alternating current is used, or it may be indirectly associated with the electrodes, as through a transformer as shown in Fig. 5, when alternating current is used. Furthermore, the electrical measuring means may be directly associated with the electrical circuit associating the two electrodes, as when a direct or alternating current ammeter is connected in the electrode circuit, or it may be indirectly associated as through transformers or other means in the case of some alternating current measurements.

Also the method may be practiced by maintaining a constant potential at the source of current and making a record of the variations in current as the drilling apparatus is moved to different depths, or the current may be maintained constant and the value of potential required to maintain the constant current may be recorded, or a record may be made of both current and potential.

Electric current is used to embrace both direct and alternating currents. Direct currents may be defined as either continuous, or pulsating currents in some instances, while alternating currents may include commercial alternating currents, medium and high frequency currents, and, in suitable instances, recurring pulsatory currents.

Natural earth potential measurements may also be obtained by connecting the drilling system and the distant electrode to the input circuit (grid-filament) of the triode tube, or to the input circuit of a vacuum thermocouple, the output circuit being in either case connected to a suitable electrical measuring means in a manner comparable to that above described. Changes, and often reversals, in the natural earth potentials are obtained as the drill penetrates different strata. These changes in potential are probably due to (1) the non-uniform distribution of lateral flowing current with depth, and (2) differences in chemical properties of the natural earth waters in the various strata.

It will be understood that, instead of taking continuous electrical measurements as above described, a series of separate electrical measurements may be taken at suitable frequent intervals of time or depth, the purpose being, in general, to obtain measurements of the electrical characteristics of the portion of the earth included electrically between the drill pipe and the remote electrode, with the drill pipe extending to different depths within the bore hole.

Such electrical characteristics may include naturally occurring earth potentials, or electrical properties obtainable through the passage of current through the earth. These last-named properties or characteristics may include resistance, conductivity, impedance, reactance, dielectric properties, phase-shift, etc., dependent upon the circuits used to pass the current through the earth and the circuit and type of electrical measuring means used to recognize such properties. In any event the electrical properties of the strata are determined by variations produced on a suitable electrical measuring means, in response to variations in an electrical variable, produced by variations in said electrical properties of the different strata as the drilling apparatus traverses the bore hole.

I claim:

1. A method for determining variations in an electrical property of the strata at different depths traversed by a bore hole during the process of drilling said bore hole, which comprises: taking a measurement of an electrical variable in an electrical circuit comprising a drilling apparatus extending within a bore hole and serving as an electrode, another electrode connected to the earth at a position removed from said bore hole, and the portion of the earth included electrically between said electrodes; and repeating such measurement as said drilling apparatus is extended to different depths, while maintaining said other electrode substantially at a fixed position, said drilling apparatus being exposed to electrical contact with the wall of said bore hole throughout substantially its entire length, and said other electrode being sufficiently distant from the bore hole so that the measurements obtained are influenced to an important degree by variations in an electrical property of the formation adjacent the lower end of the drilling apparatus.

2. A method for determining variations in an electrical property of the strata at different depths traversed by a bore hole during the drilling of said bore hole, which comprises: passing an electric current through the earth between an electrode comprising a drilling apparatus extending within a bore hole, and another electrode connected to the earth at a position removed from said bore hole; taking a measurement of an electrical variable indicative of the electrical conductivity of the path of said current through the earth; and repeating the passage of such current and the taking of such measurement as the drilling apparatus is extended to different depths within the bore hole, while maintaining said other electrode substantially at a fixed position, said drilling apparatus being exposed to electrical contact with the wall of said bore hole throughout substantially its entire length whereby the flow of said electric current between the drilling apparatus and the earth is caused to take place throughout substantially the entire length of said drilling apparatus, and said last-named electrode being sufficiently removed from said bore hole so that variations in electrical conductivity of the strata adjacent the lower end of the drilling apparatus produce measurable variations in the measured electrical variable as said drilling apparatus is extended to different depths.

3. A method for determining variations in an electrical property of the strata at different depths traversed by a bore hole during the drilling of said bore hole, which comprises: passing an alternating electric current through the earth between an electrode comprising a drilling apparatus extending within a bore hole, and another electrode connected to the earth at a position removed from said bore hole; taking a measurement of an electrical variable indicative of the electrical impedance of the path of said current through the earth; and repeating the passage of such current and the taking of such measurement as the drilling apparatus is extended to different depths within the bore hole, while maintaining said other electrode substantially at a fixed position, said drilling apparatus being exposed to electrical contact with the wall of said bore hole throughout substantially its entire length whereby the flow of said electric current between the drilling apparatus and the earth is caused to take place throughout substantially the entire length of said drilling apparatus, and said last-named electrode being sufficiently removed from said bore hole so that variations in electrical impedance of the strata adjacent the lower end of the drilling apparatus produce measurable variations in the measured electrical variable as said drilling apparatus is extended to different depths.

4. A method for determining variations in an electrical property of the strata at different depths traversed by a bore hole during the drilling of said bore hole, which comprises: passing an electric current through the earth between an electrode comprising a drilling apparatus extending within a bore hole, and another electrode connected to the earth at a position removed from said bore hole; taking a measurement of an electrical variable indicative of the electrical resistance of the path of said current through the earth; and repeating the passage of such current and the taking of such measurement as the drilling apparatus is extended to different depths within the bore hole, while maintaining said other electrode substantially at a fixed position, said drilling apparatus being exposed to electrical contact with the wall of said bore hole throughout substantially its entire length whereby the flow of said electric current between the drilling apparatus and the earth is caused to take place throughout substantially the entire length of said drilling apparatus, and said last-named electrode being sufficiently removed from said bore hole so that variations in electrical resistance of the strata adjacent the lower end of the drilling apparatus produce measurable variations in the measured electrical variable as said drilling apparatus is extended to different depths.

5. A method for determining variations in an electrical property of the strata at different depths traversed by a bore hole during the drilling of said bore hole, which comprises: passing an alternating electric current through the earth between an electrode comprising a drilling apparatus extending within a bore hole, and another electrode connected to the earth at a position removed from said bore hole; taking a measurement of an electrical variable indicative of the dielectric properties of the path of said current through the earth; and repeating the passage of such current and the taking of such measurement as the drilling apparatus is extended to different depths within the bore hole, while maintaining said other electrode substantially at a fixed position, said drilling apparatus being exposed to electrical contact with the wall of said bore hole throughout substantially its entire length whereby the flow of said electric current between the drilling apparatus and the earth is caused to take place throughout substantially the entire length of said drilling apparatus, and said last-named electrode being sufficiently removed from said bore hole so that variations in dielectric properties of the strata adjacent the lower end of the drilling apparatus produce measurable variations in the measured electrical variable as said drilling apparatus is extended to different depths.

6. A method for determining variations in an electrical property of the strata at different depths traversed by a bore hole, during the drilling of said bore hole, which comprises: passing an electric current through the earth between an electrode comprising a drilling apparatus extending within a bore hole, and another electrode connected to the earth at a position removed from said bore hole; taking a measurement, in an electrical circuit associated with said electrodes, of an electrical variable indicative of the electrical conductivity of the path of said current through the earth; and repeating the passage of such current and the taking of such measurement as the drilling apparatus is extended to different depths within the bore hole, while maintaining said other electrode substantially at a fixed position, said drilling apparatus being exposed to electrical contact with the wall of said bore hole throughout substantially its entire length whereby the flow of said electric current between the drilling apparatus and the earth is caused to take place throughout substantially the entire length of said drilling apparatus, and said last-named electrode being sufficiently distant from said bore hole to cause a measurable portion of said current to flow through substantially the entire length of said drilling apparatus within the bore hole and to flow between the strata and the drilling apparatus adjacent the lower end of the drilling apparatus so that variations in the electrical conductivity of the strata adjacent the lower end of the drilling apparatus produce measurable variations in the measured electrical variable, as said drilling apparatus is extended to different depths.

7. A method for determining variations in an electrical property of the strata at different depths traversed by a bore hole during the drilling of said bore hole, which comprises: passing an electric current through the earth between an electrode comprising a drilling apparatus extending within a bore hole, and another electrode connected to the earth at a position removed from said bore hole; taking a measurement, in an electrical circuit associated with said electrodes, of an electrical variable indicative of the electrical impedance of the path of said current through the earth; and repeating the passage of such current and the taking of such measurement as the drilling apparatus is extended to different depths within the bore hole, while maintaining said other electrode substantially at a fixed position, said drilling apparatus being exposed to electrical contact with the wall of said bore hole throughout substantially its entire length whereby the flow of said electric current between the drilling apparatus and the earth is caused to take place throughout substantially the entire length of said drilling apparatus, and said last-named electrode being sufficiently distant from said bore hole to cause a measurable portion of said current to flow through substantially the entire length of said drilling apparatus within the bore hole and to flow between the strata and the drilling apparatus adjacent the lower end of the drilling apparatus so that variations in the electrical impedance of the strata adjacent the lower end of the drilling apparatus produce measurable variations in the measured electrical variable as said drilling apparatus is extended to different depths.

8. A method for determining variations in an electrical property of the strata at different depths traversed by a bore hole during the drilling of said bore hole, which comprises: passing an electric current through the earth between an electrode comprising a drilling apparatus extending within a bore hole, and another electrode connected to the earth at a position removed from said bore hole; taking a measurement, in an electrical circuit associated with said electrodes, of an electrical variable indicative of the electrical resistance of the path of said current through the earth; and repeating the passage of such current and the taking of such measurement as the drilling apparatus is extended to different depths within the bore hole, while maintaining said other electrode substantially at a fixed position, said drilling apparatus being exposed to electrical contact with the wall of said bore hole throughout substantially its entire length whereby the flow of said electric current between the drilling apparatus and the earth is caused to take place throughout substantially the entire length of said drilling apparatus, and said last-named electrode being sufficiently distant from said bore hole to cause a measurable portion of said current to flow through substantially the entire length of said drilling apparatus within the bore hole and to flow between the strata and the drilling apparatus adjacent the lower end of the drilling apparatus so that variations in the electrical resistance of the strata adjacent the lower end of the drilling apparatus produce measurable variations in the measured electrical variable as said drilling apparatus is extended to different depths.

9. A method for determining variations in an electrical property of the strata at different depths traversed by a bore hole during the drilling of said bore hole, which comprises: passing an electric current through the earth between an electrode comprising a drilling apparatus extending within a bore hole, and another electrode connected to the earth at a position removed from said bore hole; taking a measurement, in an electrical circuit associated with said electrodes, of an electrical variable indicative of the dielectric properties of the path of said current through the earth; and repeating the passage of such current and the taking of such measurement as the drilling apparatus is extended to different depths within the bore hole, while maintaining said other electrode substantially at a fixed position, said drilling apparatus being exposed to electrical contact with the wall of said bore hole throughout substantially its entire length whereby the flow of said electric current between the drilling apparatus and the earth is caused to take place throughout substantially the entire length of said drilling apparatus, and said last-named electrode being sufficiently distant from said bore hole to cause a measurable portion of said current to flow through substantially the entire length of said drilling apparatus within the bore hole and to flow between the strata and the drilling apparatus adjacent the lower end of the drilling apparatus so that variations in the dielectric properties of the strata adjacent the lower end of the drilling apparatus produce measurable variations in the measured electrical variable as said drilling apparatus is extended to different depths.

10. An apparatus for use in determining the nature of the strata traversed by a bore hole, during the process of drilling said bore hole, which comprises: a drilling apparatus constituting an electrode and extending within a bore hole and exposed to electrical contact with the wall of said bore hole throughout substantially its entire length; another electrode connected to the earth at a point removed from said bore hole; an electrical circuit associated with said two electrodes; and electrical measuring means associated with said electrical circuit, said last-named electrode being sufficiently distant from said bore hole so that measurements obtained on said measuring means are influenced to an important degree by an electrical property of the strata adjacent the lower end of said drilling apparatus.

11. An apparatus for use in determining the nature of the strata traversed by a bore hole during the process of drilling said bore hole, which comprises: a drilling apparatus constituting an electrode and extending within a bore hole and exposed to electrical contact with the wall of said bore hole substantially throughout its length; another electrode connected to the earth at a point removed from said bore hole; an electrical circuit associated with said two electrodes; means associated with said electrical circuit for passing an electric current through the earth between said electrodes; and electrical measuring means associated with said electrical circuit, said last-named electrode being sufficiently distant from said bore hole so that measurements obtained on said measuring means are influenced to an important degree by an electrical property of the strata adjacent the lower end of said drilling apparatus.

12. An apparatus for use in determining the nature of the strata traversed by a bore hole during the process of drilling said bore hole, which comprises: a drilling apparatus constituting an electrode and extending within a bore hole and exposed to electrical contact with the wall of said bore hole substantially throughout its entire length; another electrode connected to the earth at a position removed from said bore hole; an electrical circuit associated with said two electrodes; means associated with said electrical circuit for passing an electric current through the earth between said electrodes; and electrical measuring means associated with said electrical circuit, said last-named electrode being sufficiently distant from said bore hole so that a measurable portion of said electric current will flow through substantially the entire length of said drilling apparatus within said bore hole and between the strata and said drilling apparatus adjacent the lower end thereof, so that the measurements obtained on said measuring means are influenced to an important degree by an electrical property of the strata adjacent the lower end of said drilling apparatus.

13. An apparatus for use in determining the nature of the strata traversed by a bore hole during the process of drilling said bore hole, which comprises: an electrical circuit including a drilling apparatus constituting an electrode and extending within the bore hole, another electrode connected to the earth at a position removed from said bore hole, and the portion of the earth included electrically between said electrodes; and electrical measuring means associated with said circuit, said electrical measuring means having sufficient time lag to minimize the effect of transitory variations in said electrical circuit and said last-named electrode being sufficently distant from said bore hole so that variations obtained on said measuring means are influenced to an important degree by an electrical property of the strata adjacent the lower end of said drilling apparatus.

14. An apparatus for use in determining the nature of the strata traversed by a bore hole during the process of drilling said bore hole, which comprises: a drilling apparatus constituting an electrode and extending within a bore hole and exposed to electrical contact with the wall of said bore hole substantially throughout its length; another electrode connected to the earth at a point removed from said bore hole; an electrical circuit associated with said two electrodes; means associated with said electrical circuit for passing an electric current through the earth between said electrodes; and electrical measuring means associated with said electrical circuit and responsive to variations in the electrical conductivity of the earth included electrically between said electrodes, said last-named electrode being sufficiently distant from said bore hole so that variations obtained on said measuring means are influenced to an important degree by the electrical conductivity of the strata adjacent the lower end of said drilling apparatus.

15. An apparatus for use in determining the nature of the strata traversed by a bore hole during the process of drilling said bore hole, which comprises: a drilling apparatus constituting an electrode and extending within a bore hole and exposed to electrical contact with the wall of said bore hole substantially throughout its length; another electrode connected to the earth at a point removed from said bore hole; an electrical circuit associated with said two electrodes; means associated with said electrical circuit for passing an alternating electric current through the earth between said electrodes; and electrical measuring means associated with said electrical circuit and responsive to variations in the electrical impedance of the earth included electrically between said electrodes, said last-named electrode being sufficiently distant from said bore hole so that variations obtained on said measuring means are influenced to an important degree by the electrical impedance of the strata adjacent the lower end of said drilling apparatus.

16. An apparatus for use in determining the nature of the strata traversed by a bore hole during the process of drilling said bore hole, which comprises: a drilling apparatus constituting an electrode and extending within a bore hole and exposed to electrical contact with the wall of said bore hole substantially throughout its length; another electrode connected to the earth at a point removed from said bore hole; an electrical circuit associated with said two electrodes; means associated with said electrical circuit for passing a direct electric current through the earth between said electrodes; and electrical measuring means associated with said electrical circuit and responsive to variations in the electrical resistance of the earth included electrically between said electrodes, said last-named electrode being sufficiently distant from said bore hole so that variations obtained on said measuring means are influenced to an important degree by the electrical resistance of the strata adjacent the lower end of said drilling apparatus.

17. In an apparatus for determining variations in an electrical property of the strata at different depths traversed by a bore hole during the process of drilling said bore hole, the combination which comprises: a drilling apparatus constituting an electrode and extending within a bore hole and exposed to electrical contact with the wall of said bore hole substantially throughout its entire length; another electrode connected to the earth at a position removed from said bore hole; and means for passing an electric current through the earth between said electrodes, said last-named electrode being sufficiently distant from said bore hole so that a measurable portion of said electric current will flow through substantially the entire length of said drilling apparatus within said bore hole and between the strata and said drilling apparatus adjacent the lower end thereof, whereby the flow of said current is influenced to an important degree by an electrical property of the strata adjacent the lower end of the drilling apparatus.

18. A method for determining variations in an electrical property of the strata at different depths traversed by a bore hole during the process of drilling said bore hole, which comprises: taking a measurement of an electrical variable in an electrical circuit comprising a drilling apparatus extending within a bore hole and serving as an electrode, another electrode connected to the earth at a position removed from said bore hole, and the portion of the earth included electrically between said electrodes; repeating such measurement as said drilling apparatus is extended to different depths, while maintaining said other electrode substantially at a fixed position, said drilling apparatus being exposed to electrical contact with the wall of said bore hole throughout substantially its entire length, and said other electrode being sufficiently removed from the bore hole so that the measurements obtained are influenced to an important degree by variations in an electrical property of the formation adjacent the lower end of the drilling apparatus; recording such measurements on a recording medium; and moving said recording medium in response to movement of said drilling apparatus to said different depths.

19. A method for continuously recording variations in an electrical characteristic of the strata traversed by a bore hole during the drilling of said bore hole, which comprises: passing an electric current through the earth between an electrode comprising a drilling apparatus extending within a bore hole, and another electrode connected to the earth at a position removed from said bore hole; taking measurements of an electrical variable indicative of variations in an electrical characteristic of the path of said current through the earth as the drilling apparatus is extended to different depths within the bore hole, while maintaining said other electrode substantially at a fixed position, said drilling apparatus being exposed to electrical contact with the wall of said bore hole throughout substantially its entire length, and said other electrode being sufficiently removed from the bore hole so that variations in said electrical characteristic of the strata adjacent the lower end of the drilling apparatus produce measurable variations in the measured electrical variable; continually recording said measurements on a recording medium; and moving said recording medium in response to movement of said drilling apparatus to different depths, so as to produce a record showing the direct relationship between depth and variations in said electrical characteristic.

20. An apparatus for use in determining the nature of the strata traversed by a bore hole, during the process of drilling said bore hole, which comprises: a drilling apparatus constituting an electrode and extending within a bore hole and movable to different depths therein and exposed to electrical contact with the wall of said bore hole throughout substantially its entire length; another electrode connected to the earth at a position removed from said bore hole; an electrical circuit associated with said two electrodes; electrical measuring means associated with said electrical circuit for measuring variations in an electrical quantity in said circuit, said last-named electrode being sufficiently distant from said bore hole so that measurements obtained on said measuring means are influenced to an important degree by an electrical property of the strata adjacent the lower end of said drilling apparatus; a recording medium associated with said measuring means for recording the measurements so obtained; and means operatively associated with said drilling apparatus for moving said recording medium in response to movement of said drilling apparatus to different depths within the bore hole.

JOHN JAY JAKOSKY.